March 6, 1928.　　　　　　　　　　　　　1,661,333
A. R. GURNETT
DEVICE FOR OPENING AND CLOSING FRUIT JARS
Filed July 23, 1926
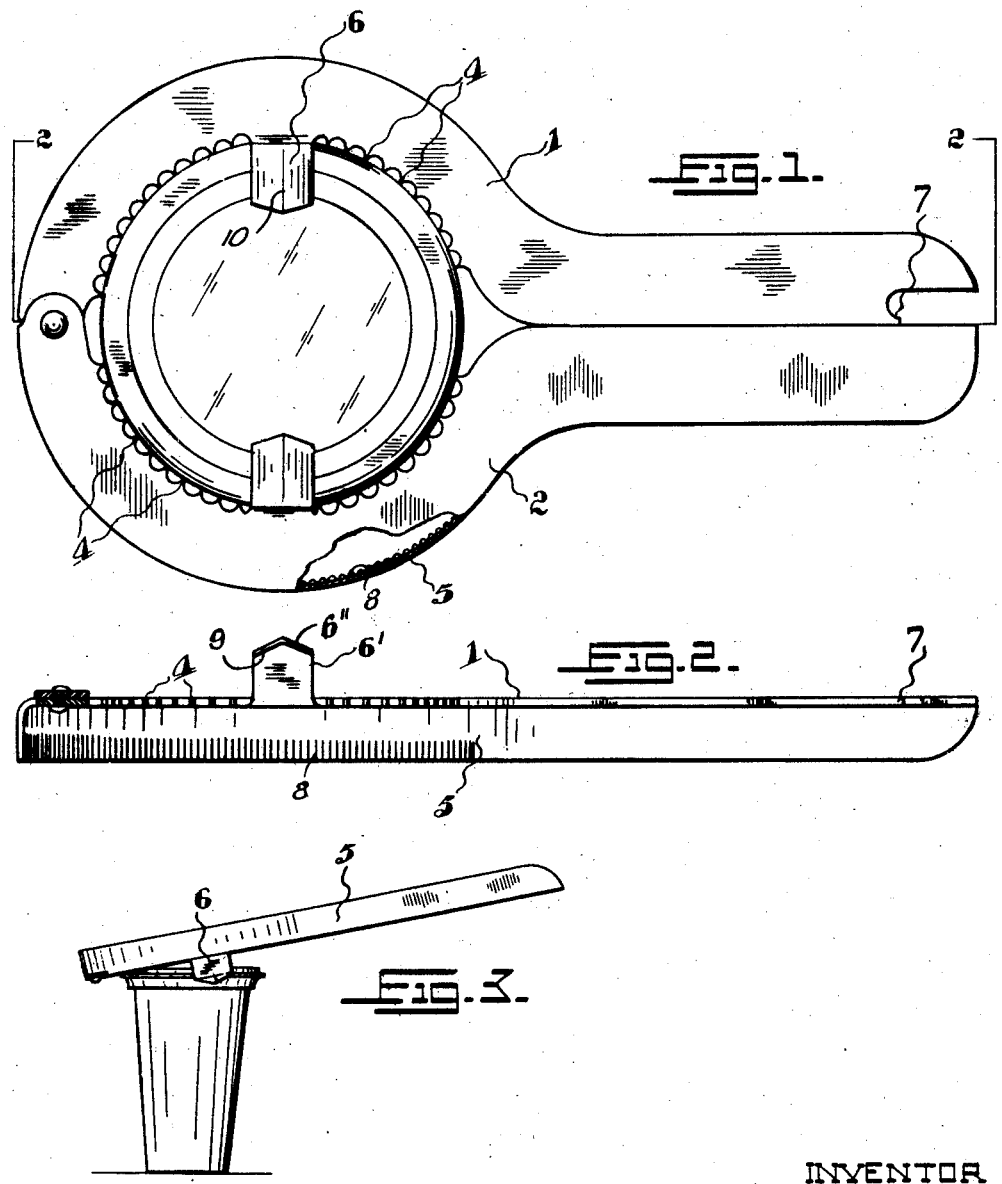

Patented Mar. 6, 1928.

1,661,333

UNITED STATES PATENT OFFICE.

ARTHUR REGINALD GURNETT, OF TORONTO, ONTARIO, CANADA, ASSIGNOR OF ONE-HALF TO MARGARET JEAN-MARIE, OF TORONTO, ONTARIO, CANADA.

DEVICE FOR OPENING AND CLOSING FRUIT JARS.

Application filed July 23, 1926, Serial No. 124,377, and in Canada June 28, 1926.

This invention relates to devices used for tightening and loosening the metal rings or caps of fruit jars, and the particular object of the present invention is to devise a construction which is adapted to remove practically all type and sizes of covers at present employed in connection with fruit jars and glasses.

I attain my object by constructing my opener substantially as hereinafter described and illustrated in the accompanying drawings in which Fig. 1 is a plan view of my improved opener;

Fig. 2 a section on the line 2—2 in Fig. 1; and

Fig. 3 a side elevation illustrating a further method of use.

In the drawings like numerals of reference indicate corresponding parts in the different figures.

1 and 2 are gripping members, each provided with an integral handle, and which are pivotally connected together at one end and so shaped that a substantially perfect circular opening is formed between them, which opening is of a size adapted to receive the metal ring of an ordinary pint or quart jar. The opening being substantially circular, the ring is gripped evenly at all points of its circumference and therefore the ring is not likely to be deformed. To provide the necessary frictional grip, I preferably provide along the inside of the gripping members teeth 4, which teeth extend substantially all around the opening.

For stiffening purposes I preferably provide the outer edges of the gripping members and handles with an integral flange 5 extending substantially from end to end of the gripping members and at right angles thereto. As there are certain jars made having large size tops, I utilize this flange for the purpose of tightening and loosening these large size tops, and to prevent slipping I rib or otherwise roughen the inner surface 8 of the flanges.

I also provide each gripping member with a tongue 6 having upwardly and inwardly directed portions 6' and 6'', the inwardly directed portions 6'' being bent longitudinally of the handle at 10 as shown in Fig. 1, which tongues are adapted to rest on the top of the cover or ring to prevent downward slipping of the device. I however, desire to utilize these tongues for removing another type or cap, as illustrated in Fig. 3, in which the metal cap is removed by a lifting action, and I therefore bend these tongues in a direction transverse to the handle, as shown clearly in Fig. 2, so that its cap engaging edge 9 will be directed at such an angle to the cap as to prevent accidental disengagement when the device is used as shown in Fig. 3.

In order that the device may be used for removing caps such as generally used on bottles containing soft drinks and the like, I cut away the one handle at one side so as to form a hook 7 adapted to be engaged under the edge of the cap, and by means of which the cap may be lifted off.

From the above description it will be seen that I have devised a construction which may be used for removing most of the types of caps or covers now used on fruit jars, glasses and bottles.

What I claim is:

1. In a device of the character described, the combination of a pair of gripping members pivoted together at one end and shaped to form between them a substantially circular opening, a handle on each gripping member, and a tongue on each gripping member, the tongues having upwardly and inwardly directed portions, the inwardly directed portions being bent longitudinally of the handle.

2. In a device of the character described, the combination of a pair of gripping members pivoted together at one end and shaped to form between them a substantially circular opening; a handle on each gripping member, and an upwardly and inwardly directed tongue on each gripping member said gripping members being provided with a flange extending substantially from end to end thereof and lying substantially at a right angle thereto.

Signed at Toronto, Canada, this 20th day of July, 1926.

ARTHUR R. GURNETT.